United States Patent
Hiroshi et al.

(10) Patent No.: US 7,109,422 B2
(45) Date of Patent: Sep. 19, 2006

(54) POLYMER JACKET TUBE AND CABLE TERMINAL CONNECTOR EMPLOYING THE SAME

(75) Inventors: Sugita Hiroshi, Kawasaki (JP); Sema Nobuyuki, Kawasaki (JP)

(73) Assignee: Showa Electric Wire & Cable Co., Ltd., Kawasaki (JP)

( * ) Notice: Subject to any disclaimer, the term of this patent is extended or adjusted under 35 U.S.C. 154(b) by 0 days.

(21) Appl. No.: 10/500,579

(22) PCT Filed: Apr. 7, 2003

(86) PCT No.: PCT/JP03/04395

§ 371 (c)(1),
(2), (4) Date: Jul. 1, 2004

(87) PCT Pub. No.: WO03/085795

PCT Pub. Date: Oct. 16, 2003

(65) Prior Publication Data

US 2005/0016752 A1      Jan. 27, 2005

(30) Foreign Application Priority Data

Apr. 8, 2002      (JP) ................................ 2002-105432

(51) Int. Cl.
*H02G 15/00*      (2006.01)
(52) U.S. Cl. ................ 174/73.1; 174/75 R; 174/137 R
(58) Field of Classification Search ............ 174/73.1, 174/75 R, 137 R See application file for complete search history.

(56) References Cited

U.S. PATENT DOCUMENTS

| | | | | |
|---|---|---|---|---|
| 2,498,589 A | * | 2/1950 | Steinke | ........................ 439/322 |
| 6,677,528 B1 | | 1/2004 | Amerpohl et al. | |
| 2003/0003802 A1 | | 1/2003 | Amerphol et al. | |

FOREIGN PATENT DOCUMENTS

| | | |
|---|---|---|
| JP | 02-290120 | 11/1990 |
| JP | 6-5339 | 1/1994 |
| JP | 11-203970 | 7/1999 |
| WO | WO98/45917 | * 10/1998 |

* cited by examiner

*Primary Examiner*—Jinhee Lee
(74) *Attorney, Agent, or Firm*—Bacon & Thomas, PLLC

(57) ABSTRACT

A polymer jacket tube includes a conductor bar which has a conductor insertion hole at its lower end, a rigid insulation sleeve around the outer periphery of the conductor bar, and a polymer covering on the outer periphery of the insulation sleeve. The insulation sleeve includes a large-diameter insulation sleeve at the lower, outer peripheral portion of the conductor bar, and a small-diameter insulation sleeve surrounding the outer peripheral portion of the conductor bar except for the distal end thereof. An embedded metal fitting for electrical stress relief is buried in the continuous portion of the large-diameter insulation sleeve and the small-diameter insulation sleeve. A cone-shaped reception port receives the stress cone of a cable terminal and is located at the lower end of the large-diameter insulation sleeve, which reception port is in communication with the conductor insertion hole of the conductor.

12 Claims, 6 Drawing Sheets

POLYMER JACKET TUBE AND CABLE TERMINAL CONNECTOR EMPLOYING THE SAME

TECHNICAL FIELD

This invention relates to a polymer jacket tube and a cable terminal connector employing the polymer jacket tube. More particularly, it relates to a polymer jacket tube which has a simplified structure, less weight, which facilitates on-site installation, and which need not be filled with an insulating compound such as insulating oil or insulating gas, and to a cable terminal connector which employs the polymer jacket tube.

BACKGROUND ART

Heretofore, as a cable terminal connector of this type, one constructed as shown in FIG. 5 has been known. Referring to the figure, the cable terminal connector in the prior art includes a cable terminal 20, and a porcelain jacket tube 21 which envelops the cable terminal 20, and which is filled with an insulating compound 22 such as insulating oil or insulating gas.

Here, an annular bottom metal fitting is mounted on the bottom part of the porcelain jacket tube 21, and an epoxy seat 24 is disposed concentrically with the porcelain jacket tube 21 at the lower part of the interior of this porcelain jacket tube 21. Besides, an upper metal fitting 24 and an upper covering 25 are respectively disposed at the top part of the porcelain jacket tube 21, and a conductor bar 26 is disposed concentrically with the porcelain jacket tube 21 at the upper central part of this porcelain jacket tube 21. Incidentally, the lower end part of the conductor bar 26 is located within the porcelain jacket tube 21, and the distal end part thereof is gastightly led out upwards from the central parts of the upper metal fitting 24 and the upper covering 25.

Besides, a stress cone 28 is mounted on the outer periphery of a cable insulator 27 constituting the cable terminal 20, and a conductor terminal 29 is attached to the distal end part of a cable conductor (not shown).

In the cable terminal connector of such a construction, the conductor terminal 29 is connected to that lower end part of the conductor bar 26 which is located within the porcelain jacket tube 21, and the outer surface of the stress cone 28 is held in pressed contact with the inwall surface of the epoxy seat 24.

By the way, in the figure, numeral 30 designates a pressing device which presses the stress cone 28, each of signs 31a and 31b a sealing portion, numeral 32 a clamp metal fitting, numeral 33 a mounting insulator, and numeral 34 a mounting stand.

In the cable terminal connector of such a construction, however, the connection node between the conductor terminal 29 and the conductor bar 26 exists in the interior of the porcelain jacket tube 21, and there have been drawbacks as stated below.

In the first place, there has been the drawback that, since the epoxy seat 24 for receiving the stress cone 28 exists inside the porcelain jacket tube 21, the diameter of the porcelain jacket tube 21 enlarges accordingly, resulting in the heavy weight of the porcelain jacket tube 21.

Secondly, there has been the drawback that, when the outside diameter of the porcelain jacket tube 21 enlarges, the projected cross-sectional area thereof becomes large, resulting in the degradation of the characteristic of the pollution withstand voltage of the porcelain jacket tube 21, so an elongated porcelain jacket tube must be used to meet a predetermined characteristic of pollution withstand voltage.

Thirdly, the porcelain jacket tube 21 is filled with the insulating compound 22, so that when the porcelain jacket tube 21 has broken down, the insulating compound 22 might flow out of this porcelain jacket tube 21 to cause a secondary disaster.

Fourthly, there has been the drawback that, since the components such as epoxy seat 24, upper covering 25 and clamp metal fitting 32 are required, a large number of components and a complicated structure are involved.

There has also been known a cable terminal connector wherein a polymer jacket tube is therefore used instead of the porcelain jacket tube 21 shown in FIG. 5, and wherein the polymer jacket tube is filled with an insulating oil or insulating gas. In such a cable terminal connector, however, the jacket tube is formed of a polymer being a high-molecular material, so that a water content might penetrate therethrough from outside to mix into the insulating oil or insulating gas contained in the polymer jacket tube, and to deteriorate the performance of the insulating oil or insulating gas.

Meanwhile, there has been developed a cable terminal connector wherein, as shown in FIG. 6, a cable terminal 40 is enveloped in a polymer jacket tube 41. Here, the polymer jacket tube 41 includes a conductor bar 42 which is centrally disposed, a rigid insulation sleeve 43 which is disposed on the outer periphery of the conductor bar 42, and a polymer covering 44 which is provided integrally with the outer periphery of the insulation sleeve 43.

Unlike the porcelain jacket tube, the polymer jacket tube 41 of such a construction does not include therein any epoxy seat for receiving a stress cone and need not be filled with any insulating compound, so that the structure of the polymer jacket tube 41 can be simplified, and the weight thereof can be lightened. Further, the individual portions of the polymer jacket tube 41 can be put into the form of units and transported to a site, so that the on-site execution time of this polymer jacket tube 41 can be shortened.

In the cable terminal connector employing such a polymer jacket tube, however, the connection node between the cable conductor 45 of the cable terminal 40 and the conductor bar 42 exists in the interior of the polymer jacket tube 41, and there has been the drawback that, as in the porcelain jacket tube stated before, the outside diameter of the polymer jacket tube 41 enlarges to make the weight thereof heavy. Besides, when the diameter of polymer jacket tube 41 enlarges, its projected cross-sectional area becomes large. This results in the drawback that an elongated polymer jacket tube must be used for attaining enhancement in the characteristic of pollution withstand voltage.

The present invention has been made in order to solve the drawbacks mentioned above, and it has for its object to provide a polymer jacket tube which is lighter in weight and more compact than the prior-art polymer jacket tube and which can attain the simplification of a structure, and a cable terminal connector which employs the polymer jacket tube.

DISCLOSURE OF THE INVENTION

In order to accomplish the above object, the polymer jacket tube of the present invention consists in a polymer jacket tube having a rigid insulation sleeve which includes a conductor bar centrally, and which includes a reception port for a cable terminal at its lower end part, and a polymer covering which is provided integrally with an outer periphery of the insulation sleeve, and which is formed with a large number of shades at its own periphery in a manner to be spaced from one another in its longitudinal direction; wherein the reception port is located at a position lower than said polymer covering.

Besides, the polymer jacket tube of the present invention consists in that a conductor insertion hole which communicates with said reception port is provided at a lower end part of the conductor bar, and that the conductor insertion hole is located at a position lower than said polymer covering.

Further, the polymer jacket tube of the present invention consists in that said insulation sleeve is provided integrally with an outer periphery of the conductor bar.

Besides, the polymer jacket tube of the present invention consists in a polymer jacket tube having a rigid insulation sleeve which includes a conductor bar centrally, and which includes a reception port for a cable terminal at its lower end part, and a polymer covering which is provided integrally with an outer periphery of the insulation sleeve, and which is formed with a large number of shades at its own periphery in a manner to be spaced from one another in its longitudinal direction; wherein said rigid insulation sleeve is provided with a metal fitting which includes a flange; said polymer covering is located at a position higher than said metal fitting; and the reception port is located at a position lower than said metal fitting.

Further, said metal fitting in the polymer jacket tube of the present invention consists in being constructed of an embedded metal fitting for electrical stress relief as is buried in and fixed to said rigid insulation sleeve.

Besides, the cable terminal connector of the present invention consists in that the cable terminal is mounted in the reception port of the polymer jacket tube.

According to the polymer jacket tube of the present invention and the cable terminal connector employing this polymer jacket tube, there are advantages as stated below.

In the first place, since the polymer covering is provided integrally with the outer periphery of the rigid insulation sleeve, the polymer jacket tube is lighter in weight and is less liable to damage than the prior-art porcelain jacket tube, and the handling of the polymer jacket tube can be more facilitated to sharply enhance a working property.

Secondly, since an insulating oil or insulating gas is not required, environment consciousness can be attained.

Thirdly, in a case where the polymer covering is formed of a silicone polymer, the characteristic of pollution withstand voltage can be enhanced owing to the water repellency of the silicone polymer.

Fourthly, since the reception port of the insulation sleeve is located at a position lower than the polymer covering, the polymer jacket tube can be made finer than the prior-art polymer jacket tube, and in consequence of the fine polymer jacket tube, the projected cross-sectional area of the polymer jacket tube becomes small, with the result that even a short polymer jacket tube can meet a predetermined characteristic of pollution withstand voltage.

Fifthly, since the connection between the conductor bar and the cable conductor is made at a position lower than the polymer covering, the step-stripped processing section of the cable terminal can be shortened.

Sixthly, since the embedded metal fitting is buried in the polymer jacket tube and is made integral with the bottom metal fitting, the polymer jacket tube can be mechanically reinforced, and it can be easily and stably mounted on a mounting stand or the like through the bottom metal fitting.

BEST MODE FOR CARRYING OUT THE INVENTION

Now, preferred embodiments of a polymer jacket tube according to the present invention and a cable terminal connector employing the polymer jacket tube will be described with reference to the drawings.

Figure 1:
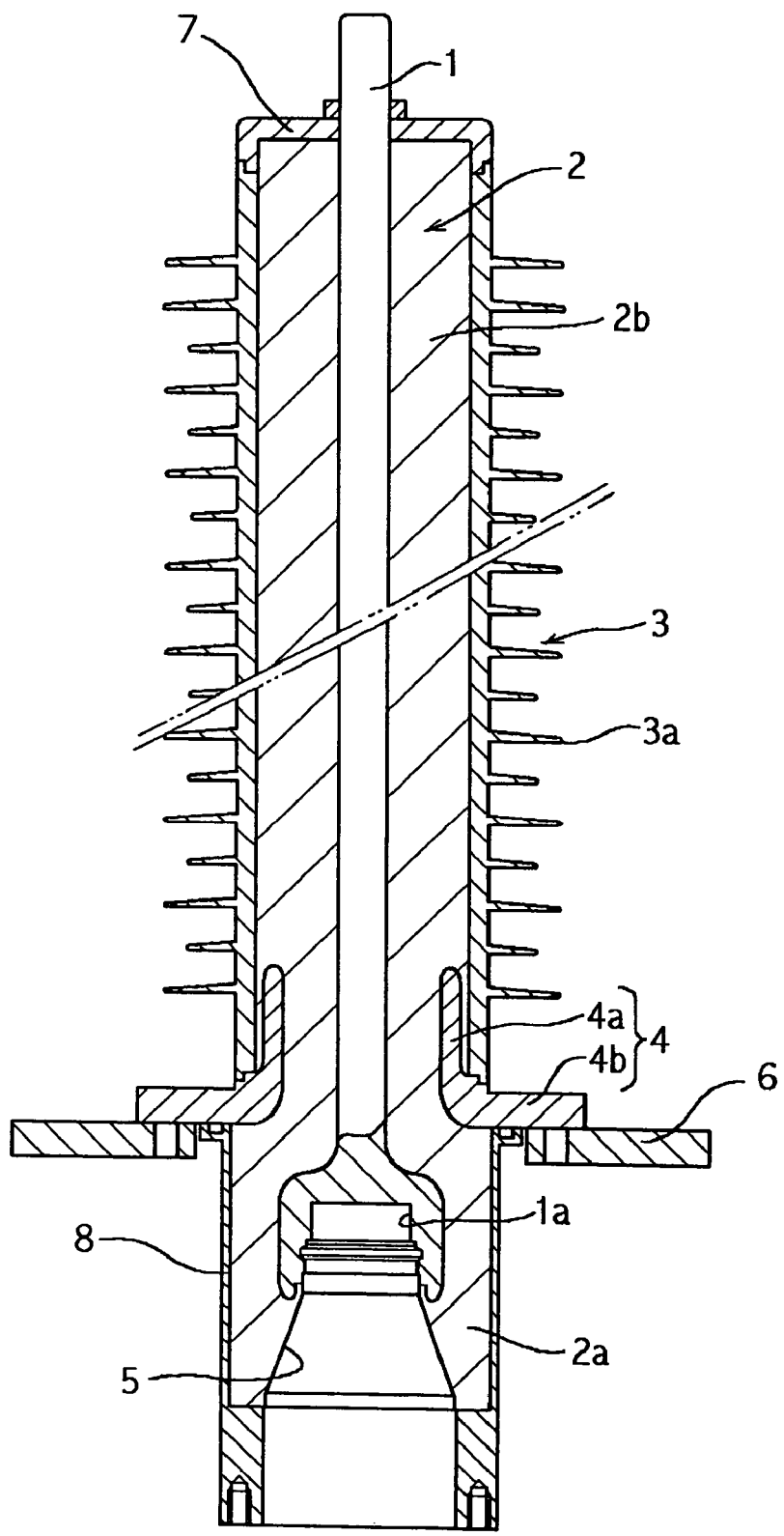
FIG. 1 is a sectional view of a polymer jacket tube according to the present invention.
Figure 2:
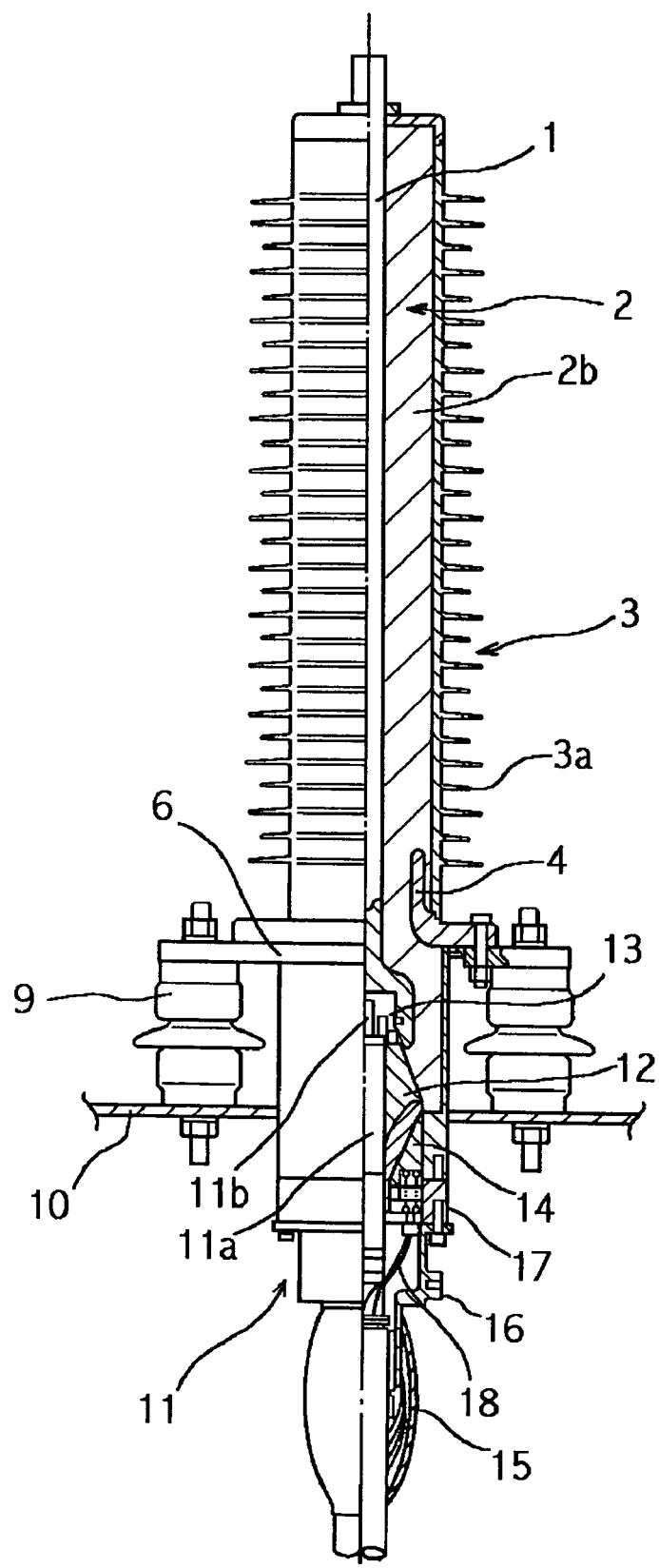
FIG. 2 is a partly sectional view of a cable terminal connector according to the present invention.

FIG. 1 shows a vertical sectional view of the polymer jacket tube of the present invention, while FIG. 2 shows a partly sectional view of an air termination for a cable which employs the polymer jacket tube of the present invention.

Referring to FIG. 1, the polymer jacket tube of the present invention includes a conductor bar 1 which has a conductor insertion hole 1a at its lower end part, a rigid insulation sleeve 2 which is disposed on the outer periphery of the conductor bar 1, and a polymer covering 3 which is disposed on the outer periphery of the insulation sleeve 2. Here, the insulation sleeve 2 is formed of a material of high mechanical strength, for example, a rigid plastic resin such as epoxy resin or FRP (fiber reinforced plastic). Besides, the polymer covering 3 is formed of a material of excellent electric insulation performance, for example, a high-molecular insulating material such as silicone polymer. The conductor bar 1, insulation sleeve 2 and polymer covering 3 are integrally formed by molding.

The insulation sleeve 2 includes a large-diameter insulation sleeve 2a which is provided at the outer peripheral part of the lower portion of the conductor bar 1, that is, at the outer peripheral part of a portion corresponding to the conductor insertion hole 1a, and a small-diameter insulation sleeve 2b which is provided in continuation to the large-diameter insulation sleeve 2a and which is provided at the outer peripheral part of the portion of the conductor bar 1 except the distal end part thereof, and an embedded metal fitting 4 for electrical stress relief is buried in the continuous portion of the large-diameter insulation sleeve 2a and the small-diameter insulation sleeve 2b. Besides, a cone-shaped reception port 5 which receives the stress cone of a cable terminal to be stated later is provided at the lower end part of the large-diameter insulation sleeve 2a, and this reception port 5 is held in communication with the conductor insertion hole 1a of the conductor bar 1.

The polymer covering 3 is provided at the outer peripheral part of the small-diameter insulation sleeve 2b, and a large number of shield plates ("shades") 3a are formed on the outer peripheral part spaced from one another in the longitudinal direction of the polymer covering 3.

The embedded metal fitting 4 includes a cylindrical portion 4a which is buried concentrically with the conductor bar 1 in the lower part of the small-diameter insulation sleeve 2b, and an annular flange 4b which is provided in continuation to the lower end part of the cylindrical portion 4a and which is buried so that the outer peripheral edge part thereof may extend out of the outer peripheral part of the upper position of the large-diameter insulation sleeve 2a, and an annular bottom metal fitting 6 is fixed to the lower end surface of the outer peripheral edge part of the flange 4b through clamp bolts (not shown).

By the way, in the figure, numeral 7 designates a protective metal fitting which is made of an anticorrosive aluminum alloy or the like and which is disposed at the top part of the small-diameter insulation sleeve 2b through, if necessary, an O-ring (not shown), and numeral 8 a protective metal fitting which is disposed on the outer peripheral part of the large-diameter insulation sleeve 2a and whose upper end part is attached to the lower surface of the flange 4b of the embedded metal fitting 4.

Next, there will be described a cable terminal connector which employs the polymer jacket tube of the present invention.

First, as shown in FIG. 2, the polymer jacket tube is attached to a mounting stand 10 through mounting insulators 9 which are disposed on the lower surface of the bottom metal fitting 6. Besides, as in the prior-art cable terminal, the stress cone 12 is mounted on the outer periphery of a cable insulator 11a which has been exposed by subjecting the cable terminal to a step-stripped process, and a conductor terminal 13 is attached to the distal end part of a cable conductor 11b. Here, the stress cone 12 is formed of a premolded insulator or the like which has the rubbery elasticity of ethylene-propylene rubber (EP rubber) or the like, and the distal end part of this stress cone 12 is provided with a pencil-like cone-shaped portion which is mounted on the inwall surface of the reception port 5.

In addition, the cable terminal 11 of such a construction is inserted into the reception port 5, and a pressing device 14 which has been disposed on the cable terminal beforehand is compressed onto the reception port 5 (refer to FIG. 1). Thus, the conductor terminal 13 is plugged into and connected with the conductor insertion hole 1a (refer to FIG. 1) of the conductor bar 1, and the cone-shaped portion of the stress cone 12 is pressed against the inwall surface of the reception port 5, with the result that the insulation performance of the interface between the inwall surface of the reception port 5 and the outer peripheral surface of the cone-shaped portion is ensured.

By the way, in the figure, numeral 15 designates a sealing portion, numeral 16 a lower metal fitting, numeral 17 an adaptor, and numeral 18 a grounding conductor.

As described above, in the polymer jacket tube of the present invention, the reception port is located at the position lower than the polymer covering, so that the polymer jacket tube can be made finer than the prior-art polymer jacket tube. Besides, in consequence of the fine polymer jacket tube, the projected cross-sectional area of the polymer jacket tube becomes small, with the result that even a short polymer jacket tube can meet a predetermined characteristic of pollution withstand voltage. Further, the connection between the conductor bar and the cable conductor is made at the position lower than the polymer covering, so that the step-stripped processing section of the cable terminal can be shortened. Moreover, the embedded metal fitting is buried in the polymer jacket tube, and it is made integral with the bottom metal fitting, so that the polymer jacket tube can be mechanically reinforced, and it can be easily and stably mounted on the mounting stand or the like through the bottom metal fitting.

Figure 3:
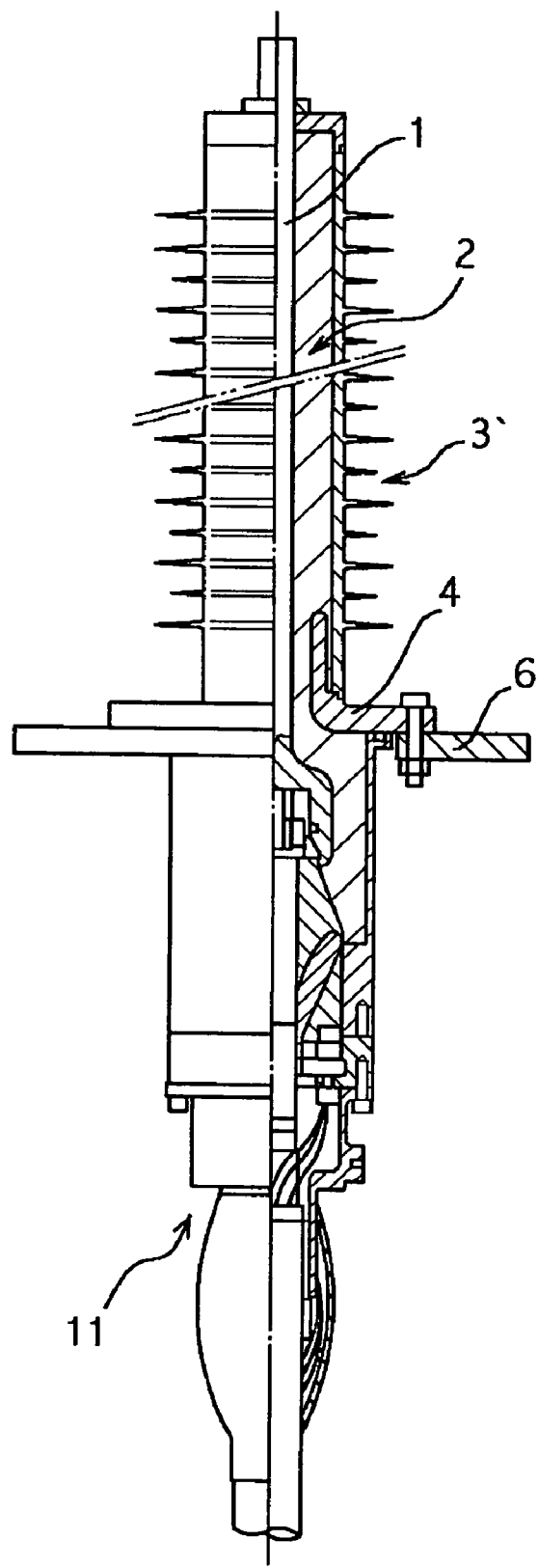
FIG. 3 is a partly sectional view concerning another embodiment of a cable terminal connector according to the present invention.
Figure 4:
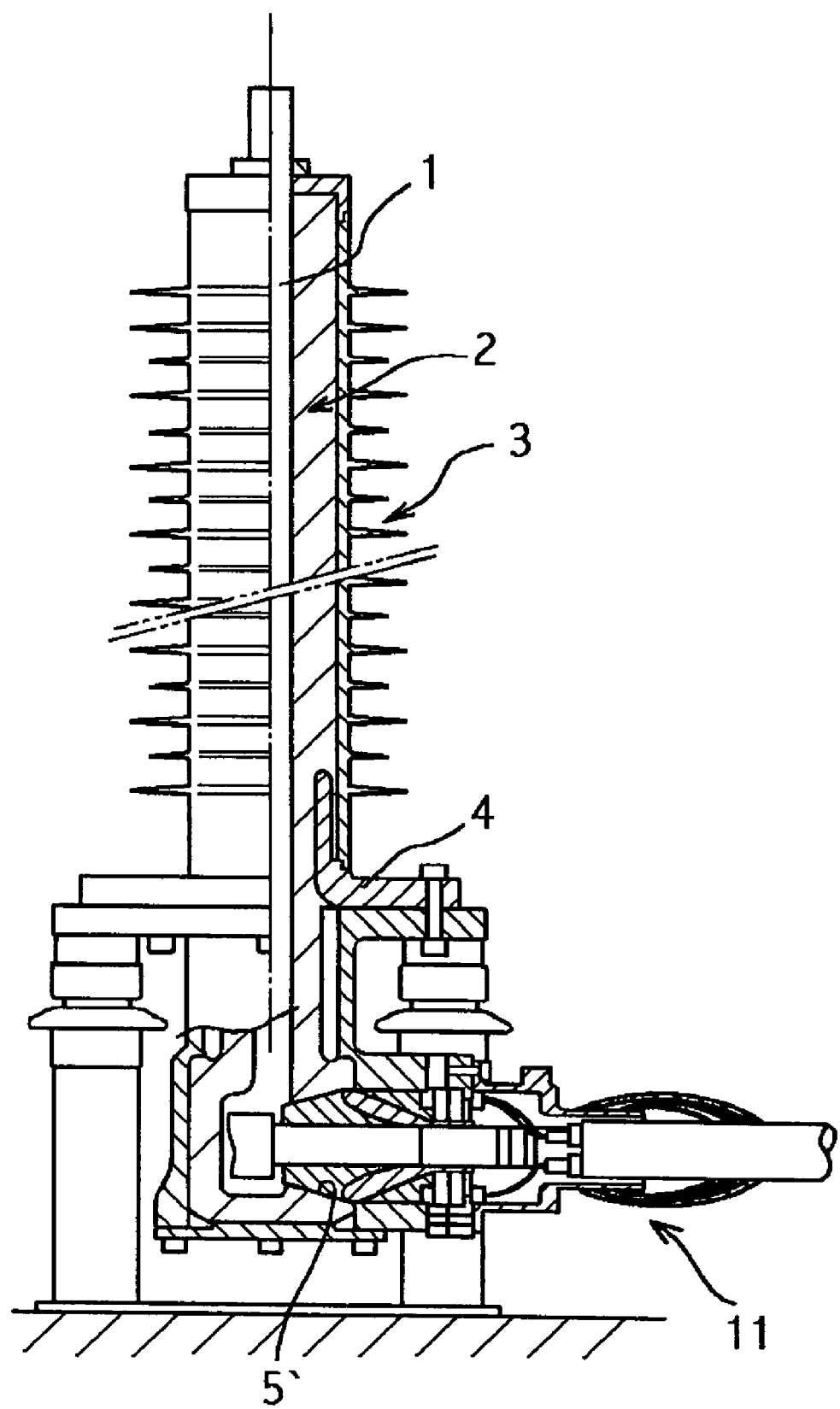
FIG. 4 is a partly sectional view concerning another embodiment of a cable terminal connector according to the present invention.
Figure 5:
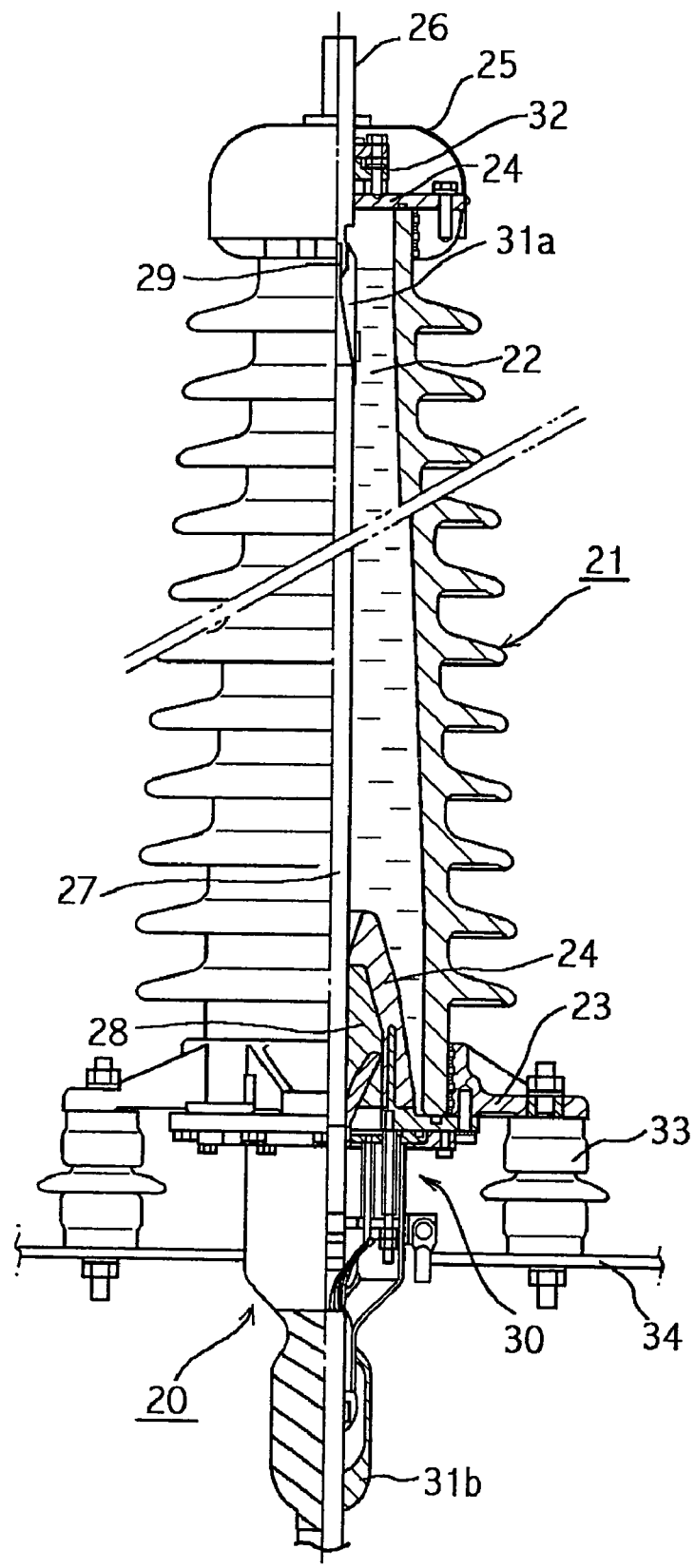
FIG. 5 is a partly sectional view of a cable terminal connector in the prior art.
Figure 6:
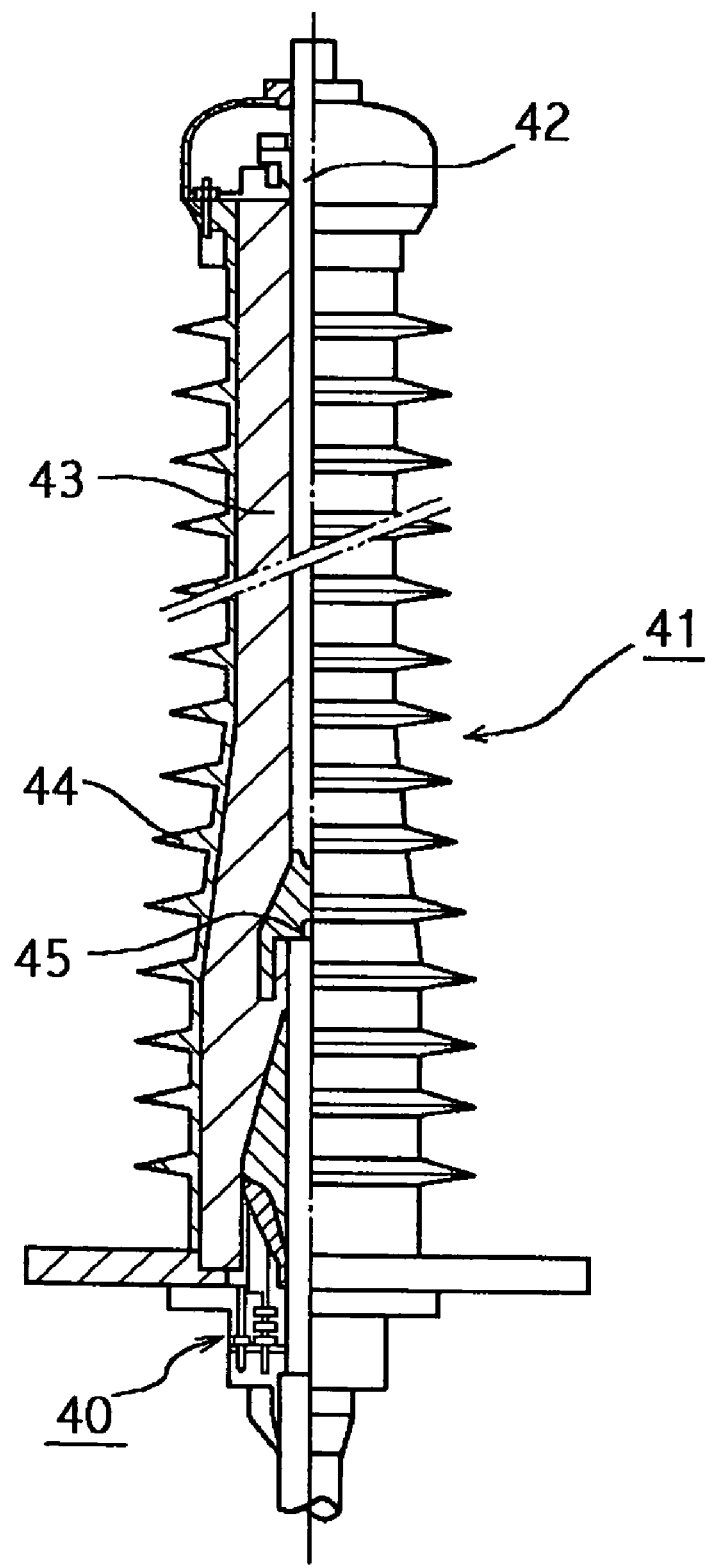
FIG. 6 is a partly sectional view of a cable terminal connector which employs a prior-art polymer jacket tube.

FIGS. 3 and 4 show other embodiments of the cable terminal connector of the present invention. By the way, in these figures, the same numerals are assigned to portions which are common to those in FIGS. 1 and 2, and which shall be omitted from detailed description.

First, in the embodiment shown in FIG. 3, the polymer jacket tube shown in FIG. 2 is replaced with a polymer jacket tube 3' which is made still finer than the former polymer jacket tube.

In this embodiment, the projected cross-sectional area of the polymer jacket tube can be made still smaller than in the foregoing embodiment, and the weight thereof can be made still lighter.

Next, in the embodiment shown in FIG. 4, there is illustrated an example in the case where a cone-shaped reception port 5' for receiving the stress cone 12 of a cable terminal 11 is bent in a horizontal direction.

In this embodiment, the cable terminal 11 can be mounted in the horizontal direction.

By the way, in the foregoing embodiments, the insulation sleeve is provided integrally with the outer periphery of the conductor bar, but it may well be provided as a member separate from the conductor bar. Besides, the reception port for the cable terminal is not restricted to be extended downwardly or horizontally, but it may well be formed so as to extend, for example, aslant. Further, the cable terminal connector is not restricted to the air termination, but it may well be applied to gas and oil terminations, etc.

INDUSTRIAL APPLICABILITY

As understood from the above description, according to the polymer jacket tube of the present invention, since a polymer covering is provided integrally with the outer periphery of a rigid insulation sleeve, the polymer jacket tube is lighter in weight and is less liable to damage than the prior-art porcelain jacket tube, and the handling of the polymer jacket tube can be more facilitated to sharply enhance a working property. Besides, since an insulating oil or insulating gas is not required, environment consciousness can be attained. Further, in a case where the polymer covering is formed of a silicone polymer, the characteristic of pollution withstand voltage can be enhanced owing to the water repellency of the silicone polymer. In addition, since the reception port of an insulation sleeve is located at a position lower than the polymer covering, the polymer jacket tube of the present invention can be made finer than the prior-art polymer jacket tube, and in consequence of the fine polymer jacket tube, the projected cross-sectional area of the polymer jacket tube becomes small, with the result that even a short polymer jacket tube can meet a predetermined characteristic of pollution withstand voltage. Besides, since the connection between a conductor bar and a cable conductor is made at a position lower than the polymer covering, the step-stripped processing section of a cable terminal can be shortened. Further, since an embedded metal fitting is buried in the polymer jacket tube and is made integral with a bottom metal fitting, the polymer jacket tube can be mechanically reinforced, and it can be easily and stably mounted on a mounting stand or the like through the bottom metal fitting.

The invention claimed is:
1. A polymer jacket tube comprising:
a rigid insulation sleeve which includes a central conductor bar;
a conical reception port for receiving a cable terminal, said conical reception port extending and narrowing from an opening in a distal end face of said rigid insulation sleeve to an opposite end adjoining said central conductor bar; and a silicone polymer covering which surrounds said conductor bar and said rigid insulation sleeve, and having a plurality of shades longitudinally spaced from one another along its outer surface;

a metal fitting for relieving electrical stress including one portion embedded in and fixed to said rigid insulation sleeve and a flange portion, said flange portion being located between said silicone polymer covering and said opening of said conical reception port; and wherein said rigid insulation sleeve, said central conductor bar, said silicone polymer covering, and said metal fitting are molded together into a single integral unit.

2. A cable terminal connector comprising the cable terminal mounted in the reception port of the polymer jacket tube as defined in claim 1, in contact with said central conductor bar.

3. A polymer jacket tube according to claim 1 wherein said silicone polymer covering extends from a distal end face in contact with said flange portion to an end of said polymer jacket tube opposite said distal end face.

4. A polymer jacket tube according to claim 3 wherein said one portion of said metal fitting is an annular ring extending in parallel with and concentric with said central conductor bar and wherein said flange portion is perpendicular to said central conductor bar and external to said silicone polymer covering.

5. A polymer jacket tube according to claim 1 wherein said one portion of said metal fitting is an annular ring extending in parallel with and concentric with said central conductor bar and wherein said flange portion is perpendicular to said central conductor bar and external to said silicone polymer covering.

6. A polymer jacket tube according to claim 1 wherein said rigid insulation sleeve has integral large and small diameter portions joined at said metal fitting and wherein said large diameter portion has said reception port formed therein.

7. A polymer jacket tube according to claim 3 wherein said rigid insulation sleeve has integral large and small diameter portions joined at said metal fitting and wherein said large diameter portion has said reception port formed therein.

8. A cable terminal connector according to claim 2 wherein said silicone polymer covering extends from a distal end face in contact with said flange portion to an end of said polymer jacket tube opposite said distal end face.

9. A cable terminal connector according to claim 8 wherein said one portion of said metal fitting is an annular ring extending in parallel with and concentric with said central conductor bar and wherein said flange portion is perpendicular to said central conductor bar and external to said silicone polymer covering.

10. A cable terminal connector according to claim 2 wherein said one portion of said metal fitting is an annular ring extending in parallel with and concentric with said central conductor bar and wherein said flange portion is perpendicular to said central conductor bar and external to said silicone polymer covering.

11. A cable terminal connector according to claim 2 wherein said rigid insulation sleeve has integral large and small diameter portions joined at said metal fitting and wherein said large diameter portion has said reception port formed therein.

12. A cable terminal connector according to claim 8 wherein said rigid insulation sleeve has integral large and small diameter portions joined at said metal fitting and wherein said large diameter portion has said reception port formed therein.

* * * * *